United States Patent Office 3,487,062
Patented Dec. 30, 1969

3,487,062
SYNERGISTIC ACCELERATOR FOR t-BUTYL PERMALEIC ACID IN METHACRYLATE POLYMERIZATION
Irvin Francis Bodycot, Wilmington, Del., assignor to E. I. du Pont de Nemours and Company, Wilmington, Del., a corporation of Delaware
No Drawing. Filed Nov. 16, 1966, Ser. No. 594,678
Int. Cl. C08f 1/60
U.S. Cl. 260—89.5       5 Claims

ABSTRACT OF THE DISCLOSURE

A process for the polymerization of aliphatic and cycloaliphatic acrylic and methacrylic acid esters which comprises adding an initiator system consisting of tertiary butyl peroxymaleate, stannous chloride, tertiary amine hydrochloride having at least 8 carbon atoms, and a mercaptan to the ester.

---

This invention relates to a process for the polymerization of aliphatic and cycloaliphatic, acrylic and methacrylic acid esters, using an improved initiator system.

It is known in the art, U.S. Patent No. 3,084,068, to polymerize aliphatic methacrylic acid esters such as methyl methacrylate with an initiator system containing a peroxide, antimony chloride, and a copper salt. It is also known, U.S. Patent No. 3,234,194, to polymerize such esters with an initiator system containing mono-tertiary butyl peroxymaleate and an amine. It is also known from Belgium Patent No. 512,853 to polymerize such esters using an initiator system containing a peroxide, tin chloride, and preferably a copper salt.

It has now been found that aliphatic and cycloaliphatic methacrylic acid esters can be polymerized at rapid rates using an initiator system that consists essentially of tertiary butyl peroxymaleate:

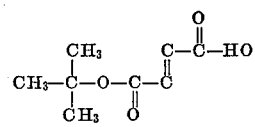

stannous chloride, a tretiary amine hydrochloride having at least 8 carbon atoms, and preferably less than 30 carbon atoms, the amine may be aliphatic, aromatic or mixed, and a mercaptan.

The present system has an advantage over many known systems in that copper salts are not needed in order to obtain rapid polymerization. Copper salts at even moderately low concentration give the often undesirable effect of adding color to the acrylic or methacrylic acid ester polymer.

The amount of tertbutyl peroxymaleate added to the acrylic or methacrylic ester to be polymerized is usually between about 0.01% and 2% by weight of the mixture and preferably in the range of 0.2% to 0.5%. The amount of stannous chloride (measured as $SnCl_2 \cdot 2H_2O$) is usually in the range of 0.0001 to 0.1 by weight of the mixture, and the amount of tertiary amine hydrochloride is usually in the range of 0.001 to 0.1 by weight of the mixture. Preferably the ratio of tertiary amine hydrochloride to stannous chloride is about 3 to 1. It is also necessary that the polymerization system contain at least a trace and preferably about 0.01 to 1% of a mercaptan. The mercaptan is a chain transfer agent and controls the molecular weight of the polymer produced. Mercaptans are conventional additives to such systems and are described in U.S. Patent No. 3,154,600 to Munn, and elsewhere in the art.

The initiator system is effective in the polymerization process throughout temperature range of from about 20° C. to about 100° C. The initiator system is effective to polymerize mixtures of various acrylic and methacrylic esters as well as polymers in monomer solutions of the various esters. Other additives such as crosslinking agents, for example, ethylene glycol dimethacrylate may also be present in the monomer or monomers to be polymerized.

In the following Examples which illustrate the invention, all parts and percentages are in parts by weight unless otherwise specified:

EXAMPLE I

A series of polymerization experiments was carried out in two-ounce, wide-mouth jars using a thermometer to follow the temperature of the mixture. (Since the polymerization reaction is exothermic, rates of polymerization can be compared by means of the rates at which the temperature increases.) All of the runs were begun at room temperature.

In each jar was placed 50 grams of distilled methyl methacrylate, 1.25 grams ethylene glycol dimethylacrylate, 0.25 gram of dodecyl mercaptan, and 0.2 gram of t-butyl permaleic acid. Different accelerator ingredients were added as follows to various jars.

(1) 0.006% $SnCl_2 \cdot 2H_2O$ only;
(2) 0.018% N,N,dimethylcyclohexylamine hydrochloride and no other;
(3) A combination of 0.006% $SnCl_2 \cdot 2H_2O$ and 0.018% N,N,dimethylcyclohexylamine hydrochloride.

In each case, the accelerator ingredients were added as a concentrated solution in methanol. After 25 minutes, the mixture of case three had reached 92° C. and boiled shortly thereafter. Mixtures one and two remained at room temperature for over 130 minutes with no indication that polymerization was taking place. Additional tests were run as follows:

(4) Added 0.036% N,N,dimethylcyclohexylamine hydrochloride. The mixture remained at room temperature for 178 minutes. At this point, 0.012% $SnCl_2 \cdot 2H_2O$ was added. An immediate temperature rise was observed so that 12 minutes later the temperature reached 65° C.
(5) Added 0.012% $NnCl_2 \cdot 2H_2O$ to the standard mixture. This showed no temperature rise for 178 minutes. 0.036% N,N,dimethylcyclohexylamine hydrochloride was then added. The temperature began to rise and in 12 minutes had reached 55° C.

EXAMPLE II

Into two-ounce, wide-mouth jars were placed 50 grams of cyclohexyl methacrylate, 1.25 grams ethylene glycol dimethylacrylate, 0.25 gram of dodecyl mercaptan, and 0.2 gram of t-butyl peroxymaleate. Combinations of other ingredients were added in the following comparisons.

(1) 0.018% N,N,dimethylcyclohexylamine hydrochloride only.
(2) 0.006% $SnCl_2 \cdot 2H_2O$ only.
(3) Both 0.018% N,N,dimethylcyclohexylamine hydrochloride and 0.006% $SnCl_2 \cdot 2H_2O$.

The mixture No. 3 became hard in 10 minutes reaching a temperature of 70° C. The mixture No. 2 partially polymerized over a period of time reaching a peak temperature of 58° C. in 125 minutes. Only the lower half cured, however. The upper portion was still liquid 24 hours later. Solution No. 1 showed no temperature rise until about 300 minutes, but then polymerized to a hard mass at 70° C. with a total elapsed time of 370 minutes.

EXAMPLE III

In a two-ounce, wide-mouth jar was placed 50 grams of distilled methyl methacrylate, 0.25 gram dodecyl mercaptan, and 0.2 gram t-butyl permaleic acid. To this was added 0.018% N,N,dimethylcyclohexylamine hydrochloride and 0.006% stannous chloride. The temperature began rising immediately. In 12 minutes, it had reached 38° C. In 57 minutes, it had hardened completely.

EXAMPLE IV

The steps of Example I may be repeated except that β-phenyl ethyl dibutylamine hydrochloride can be used instead of N,N,dimethylcyclohexylamine hydrochloride, and comparable results will be obtained.

EXAMPLE V

The steps of Example I may be repeated except that tribenzylamine hydrochloride can be used instead of N,N,dimethylcyclohexylamine hydrochloride, and comparable results will be obtained.

What is claimed is:

1. A process for the polymerization of acrylic esters selected from the class consisting of aliphatic and cycloaliphatic acrylic and methacrylic acid esters and mixtures thereof, which comprises adding 0.01 to 2 percent by weight of the total composition tertiary butyl peroxymaleate, 0.001 to 1 percent by weight of the total composition stannous chloride, 0.0001 to 0.1 percent by weight of the total composition tertiary amine hydrochloride having at least 8 carbon atoms, and 0.01 to 1 percent by weight of the total composition mercaptan to the acrylic ester to be polymerized.

2. The process of claim 1 in which the acrylic ester is methyl methacrylate.

3. The process of claim 1 in which the tertiary amine hydrochloride is N,N,dimethylcyclohexylamine hydrochloride.

4. The process of claim 3 in which the acrylic ester is methyl methacrylate.

5. The process of claim 1 in which the ratio of tertiary amine hydrochloride to stannous chloride is about 3 to 1.

References Cited

UNITED STATES PATENTS 3,234,194   2/1966   Slocum.

HARRY WONG, Jr., Primary Examiner

U.S. Cl. X.R.

260—86.1